J. McMurtry,
Brick Machine.
No. 11,487. Patented Aug. 8, 1854.
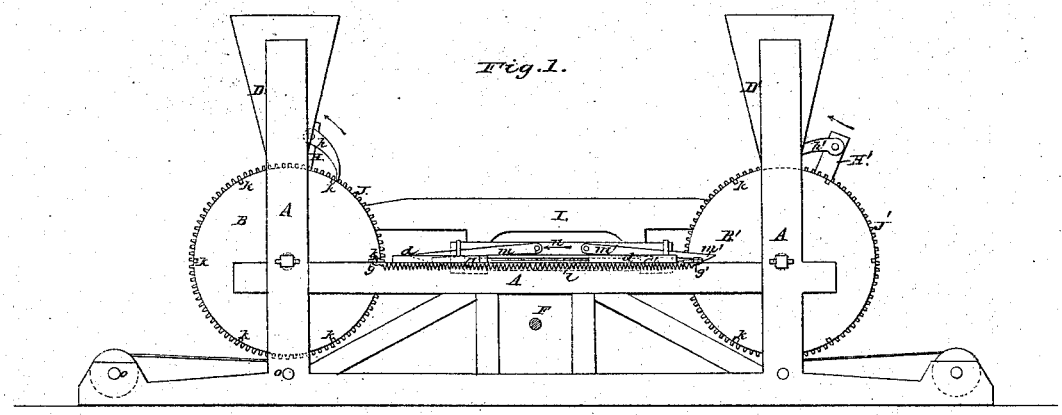
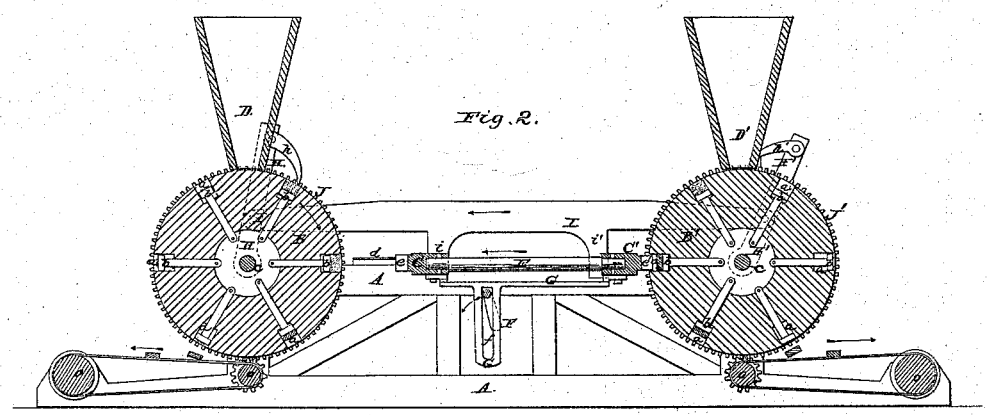
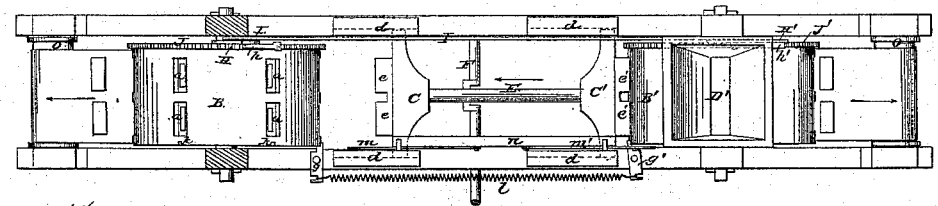
Witnesses:
O. D. Munn
R. Boeklen
Inventor:
Jno. McMurtry

UNITED STATES PATENT OFFICE.

JOHN McMURTRY, OF LEXINGTON, KENTUCKY.

MACHINE FOR MAKING BRICKS.

Specification of Letters Patent No. 11,487, dated August 8, 1854.

*To all whom it may concern:*

Be it known that I, JOHN McMURTRY, of Lexington, in the county of Fayette and State of Kentucky, have invented certain new and useful Improvements in Machinery for Making Bricks; and I do hereby declare that the following is a full, clear, and exact description of the same, reference being had to the accompanying drawings, forming part of this specification, in which—

Figure 1, is a side elevation of a machine constructed according to my invention. Fig. 2, is a longitudinal vertical section of the same. Fig. 3, is a plan of the same.

Similar letters of reference indicate corresponding parts in the several figures.

This invention relates to a novel combination and arrangement of mold cylinders and plungers; to certain means of giving rotary motion at proper intervals, to the mold cylinder; and to certain means of securing the cylinders during the compression of the brick, and releasing them between the successive compressing operations, in order to enable them to receive the necessary movement.

To enable those skilled in the art to make and use my invention, I will proceed to describe its construction and operation.

A, is the framing of the machine which may be of timber or iron of any suitable form to carry the two mold cylinders, B, B′, the two plunger heads, C, C′, the two hoppers, D, D′, and other working parts of the machine. The two mold cylinders, B, B′, are like those employed in many of the brick machines now in use, having the molds, *a, a,* sunk in or secured to their periphery. They are fitted to rotate on two stationary horizontal shafts, *c, c,* which occupy corresponding positions, at or near opposite ends of the machine, parallel with each other. The holds, *a, a,* are arranged in pairs, side by side, as shown in Fig. 3, and each is provided with the usual false or loose bottom, *b*. The hoppers, D, D′, are placed one above each cylinder to supply the mouths with clay, and may contain rollers receiving a suitable motion to grind the clay. The molds are filled as they pass under the hoppers, in the common way. The plunger heads, C, C′, are attached to opposite ends of a rod, E, and are fitted to slide back and forth on guides, *d, d,* on the sides of the framing, which are so arranged, that a plane drawn through the axes of the cylinders would pass through the center of both plunger heads. The plunger head, C, carries two metal plungers, *e, e,* of a proper size and at a proper distance apart to enter any pair of molds, *a, a,* in the mold cylinder, B, that may be presented opposite to it, and the plunger head, C′, carries two or more similar plungers, *e′, e′,* to enter any pair of molds in the mold cylinder, B′.

The plunger rod, E, receives a rectilinear motion of such length as to cause the pair of plungers belonging to one cylinder, to enter far enough into a pair of molds on that cylinder, to compress and give the required density to the clay with which they have been filled from the hopper, and then to cause the other pair of plungers to act similarly with respect to a pair of molds on the other mold cylinder, alternately. This motion in the machine represented is given to the plunger rod by means of a crank, F, which works in a slot, *f,* in a yoke, G, which connects the plunger heads. The shaft of this crank may receive motion through any suitable agency. In practice, I propose that the plunger rod shall, at the same time, constitute the piston rod of a steam engine whose cylinder shall be placed horizontally between the cylinders, or that the plungers shall be in some other suitable manner connected directly with a steam engine placed in the center of the machine.

The motion which it is necessary for the cylinders to receive during the intervals between the successive operations of the plungers, is given by means of two levers, H, H′, which are fitted, one to each cylinder shaft to swing freely, and are furnished with pawls *h, h′,* one for each, gearing with toothed wheels or rings, J, J′, attached securely to the cylinders. These levers are connected by a long coupling rod, I, from which descend two rigid arms, *i, i′,* with one of which, each plunger head, as soon as it is withdrawn from the molds, is brought into contact, and made to move the rod and both the levers, H, H′, and during such movement, the pawl on the lever belonging to the cylinder whose plunger head is retreating, engages with the teeth of the wheel on that cylinder, and turns the latter far enough to present a new pair of filled molds in the line of operation of the plungers,—the pawl of the other lever, in the meantime, passing over the teeth of its cylinder, which is required to remain stationary during the approach and operation of its plungers.

The mold cylinders are held stationary— each in its turn—by means of two catches, $g$, $g'$, which are pivoted on the top of one side of the framing, see Fig. 3, one near each cylinder, so as to be capable of engaging in either of a series of notches, $k$, $k$, made in the periphery. Of these notches there is one for each pair of molds. The catches, $g$, $g'$, are connected together by a spring, $l$, which has a tendency to throw them into the notches and secure the cylinders, but each is in its turn withdrawn to release its cylinder, as soon as the plungers have been withdrawn from the molds, by the action of one of two hooks, $m$, $m'$, which are pivoted to a bar, $n$, which is rigidly connected with the plunger heads. These hooks, when not in operation, rest upon their respective plunger heads, and each, as its plunger advances, is enabled, by its form, to pass over the catch, but as it recedes, it cannot pass until it withdraws the catch from the notch in the cylinder, and sets the cylinder free to be turned by the lever and pawl.

The false bottoms of the molds of each cylinder are intended to be furnished with rods, which, as the molds severally approach their lowest position, come in contact with a fixed eccentric, and cause the bottoms to be forced outward to discharge the bricks upon an endless apron which runs around two rollers, $o$, $o$, at either end of the machine. This discharging apparatus is not shown, as it is substantially similar to that employed on some other brick machines.

The operation of the machine is conducted in the following manner. The two hoppers are filled with clay, which may be in a dry state or with the amount of moisture usually found in fresh clay, or may be tempered, and the machine is set in motion. I will suppose that the clay in a pair of molds in the cylinder, $B'$, has just been submitted to the operation of the plungers, $e'$, $e'$, and that the said plungers have commenced their retreat, as shown in the several views in the drawing. As soon as the plunger head, $C'$, and plungers have retreated so far that the plungers have entirely left the molds, the hook, $m'$, comes in contact with, and withdraws the catch, $g'$, from the notch in the cylinder, $B'$; and as soon as the cylinder is quite free of the catch, the plunger head comes in contact with the arm, $i'$, of the rod, I, and commences moving the levers, H, H', and their pawls, $h$, $h'$, in the direction shown by arrows, when the latter pawl engaging with the wheel, J', turns the cylinder, B', but the former pawl passes freely over the teeth of the wheel, J, whose cylinder, B, is held stationary by the catch with a pair of filled molds in position ready for the operation of the plungers, $e$, $e$, which are advancing. By the time the latter plungers have advanced as far as necessary to complete their operation, the cylinder, B', has been turned far enough to present a new pair of molds ready for the return movement of the plunger rod, or the advance of the plungers, $e'$, $e'$; and the catch, $g'$, which was set free from the hook, $m'$, soon after the cylinder, B', commenced to move, has fallen into the next notch, $k$, so as to hold the said cylinder secure. The hook, $m$, which has passed over the catch, $g$, at the termination of the last movement, withdraws the catch during the early part of the return movement, but not until the plungers, $e$, $e$, have left the molds, and immediately afterwards, the plunger head, C, comes in contact with the arm, $i$, on the rod, I, and moves the levers in the opposite direction to the arrows, causing the pawl, $h$, to engage with the wheel, J, and turn the cylinder, B, but causing the pawl, $h'$, to pass over the teeth of the wheel, J', whose cylinder, B, is stationary. The continued operation is but a repetition of that described, one plunger head advancing toward its cylinder, while the other recedes from its cylinder; the one cylinder being stationary, while its plungers are advancing, and the other receiving its movement while its plungers are receding, and vice versa. The bricks as they are delivered by the apron, two for each movement of each cylinder, or four for each complete movement of the plunger rod or stroke of the engine, are carried away by hand.

A machine with two cylinders like that described, may be driven as fast as a steam engine is capable of working with advantage, and with the engine working 75 revolutions per minute, 300 bricks per minute, or 180,000 for a day of 10 hours, will be produced, but by increasing the number of molds, and putting three or four, or more, in a row, the number of bricks may be increased.

Having thus fully described my invention, I will proceed to state what I claim, and desire to secure by Letters Patent.

I do not claim the construction of the mold cylinders or arrangement of the molds as described. But

I claim—

1. The combination with one or more such mold cylinders, B, B, having molds arranged as described, of as many plunger heads, C, C', and plungers $e$, $e$, $e'$, $e'$, as may be desired, said plunger heads being arranged to work radially to the cylinders, and operated by any suitable means whereby they are caused to compress the clay in the molds substantially as herein set forth.

2. I claim arranging two mold cylinders,

B, B', such as are described, parallel with each other, and placing between them two plunger heads, C, C', attached to the same rod, E, or otherwise arranged, so as to work in a line or plane passing through the axes of both cylinders, and thereby to cause one to advance toward its cylinder to compress the clay in one or more of the molds, as the other recedes from its cylinder after a similar operation, substantially as herein set forth.

3. I claim the method herein described, of giving motion to the mold cylinders during the receding movements of their respective plungers, by means of the toothed wheels. J, J', upon the cylinders, the levers, H, H', on the cylinder shafts and their pawls, $h$, $h'$, and the coupling rod, I, which has arms, $i$, $i'$, with which the plunger heads come in contact at a proper time during their movements, the whole being combined and operating as set forth.

4. I claim the method of locking the cylinders during the advance of their respective plunger heads, and of setting them free to turn during the receding thereof, by means of the catches, $g$, $g'$, attached to the frame, the hooks, $m$, $m'$, connected with the plunger heads, and a spring, $l$, applied to the catches, all combined and operating substantially as herein described.

JNO. McMURTRY.

Witnesses:
S. H. WALES,
JNO. W. HAMILTON.